US008522807B2

(12) United States Patent
Vetterstrand et al.

(10) Patent No.: US 8,522,807 B2
(45) Date of Patent: Sep. 3, 2013

(54) ARRANGEMENT AND METHOD FOR UNLOADING RAW MATERIAL

(75) Inventors: Petri Vetterstrand, Helsinki (FI); Jorma Leppänen, Lahela (FI); Juha Hiltunen, Vantaa (FI)

(73) Assignee: Maillefer S.A., Ecublens (CH)

( * ) Notice: Subject to any disclaimer, the term of this patent is extended or adjusted under 35 U.S.C. 154(b) by 209 days.

(21) Appl. No.: 13/011,365

(22) Filed: Jan. 21, 2011

(65) Prior Publication Data

US 2011/0209773 A1 Sep. 1, 2011

(30) Foreign Application Priority Data

Feb. 10, 2010 (FI) ..................................... 20105132

(51) Int. Cl.
*B08B 9/027* (2006.01)

(52) U.S. Cl.
USPC ..................... 137/15.04; 137/15.07; 137/240; 137/244; 137/245.5; 222/1; 222/80

(58) Field of Classification Search
USPC .................. 137/15.04, 15.05, 240, 238, 244, 137/245.5, 15.07; 222/1, 80
See application file for complete search history.

(56) References Cited

U.S. PATENT DOCUMENTS 6,363,566 B1 * 4/2002 Collins ...................... 137/245.5
7,213,606 B2 * 5/2007 Nanni ........................... 137/240
2008/0212252 A1 9/2008 Kamata et al.

FOREIGN PATENT DOCUMENTS

| | | | |
|---|---|---|---|
| EP | 1 550 833 | A2 | 7/2005 |
| EP | 1 574 762 | A2 | 9/2005 |
| EP | 1 604 747 | A2 | 12/2005 |
| EP | 2 216 106 | A2 | 8/2010 |
| FR | 1 570 874 | A | 6/1969 |
| GB | 1151980 | | 5/1969 |
| GB | 1 434 775 | | 5/1976 |
| JP | A-10-059485 | | 3/1998 |
| WO | WO 2005/039985 | A1 | 5/2005 |

OTHER PUBLICATIONS

Extended European Search Report issued in European Patent Application No. 11153045.7 dated Jun. 8, 2011.
Finnish Search Report dated Oct. 5, 2010 issued in Finnish Patent Application No. 20105132 (with translation).

* cited by examiner

*Primary Examiner* — Kevin Lee
(74) *Attorney, Agent, or Firm* — Oliff & Berridge, PLC

(57) ABSTRACT

An arrangement and method for unloading raw material in connection with a cable manufacturing apparatus. The arrangement includes a feed inlet connected to the cable manufacturing apparatus for feeding raw material into the cable manufacturing apparatus, the feed inlet being adapted to be connected to an unloading spout of the raw material. The arrangement further includes a seal for opening and closing the feed inlet when the unloading spout is connected to the feed inlet.

15 Claims, 5 Drawing Sheets

2
12
17
14
13
18
16
15
1
11

ARRANGEMENT AND METHOD FOR UNLOADING RAW MATERIAL

FIELD OF THE INVENTION

The present invention relates to an arrangement for unloading raw material according to the preamble of claim 1 and specifically to an arrangement for unloading raw material in connection with a cable manufacturing apparatus, the arrangement comprising a feed inlet connected to the cable manufacturing apparatus for feeding raw material into the cable manufacturing apparatus, the feed inlet being adapted to be connected to an unloading spout of the raw material. The present invention further relates to a method for unloading raw material according to the preamble of claim 11 and specifically to a method for unloading raw material in connection with a cable manufacturing apparatus, the method comprising: connecting an unloading spout to a feed inlet and opening the unloading spout for feeding raw material into the cable manufacturing apparatus through the feed inlet.

BACKGROUND OF THE INVENTION

Manufacturing processes of high-voltage cables require that the cleanliness of the material is preserved from initial production to cable extrusion. To this end, it is important that the material remains in a closed system throughout the whole process. A critical moment occurs when a bag or a box with fresh pellets, raw material, has to be connected to the hopper of the extruder for unloading. The bag or box has to be opened in some way or another and the spout of the bag connected to the hopper of the extruder. At this moment, special care has to be taken in order to prevent pollution of the raw material with dust or other carton residues form the transport box falling into the feed opening, or with other contaminants. The raw material may for example pellets of polyethylene used for producing insulation to an electrical cable.

The conventional methods and arrangements for unloading raw material into a hopper of an extruder require considerable manual handling and intervention for connecting the unloading spout of the box or bag to the hopper of the extruder. These manual operations have to be done in clean room atmosphere and such that contamination of the raw material is prevented. The prior art methods usually comprise following manual steps: placing the raw material bag above the feed inlet of the hopper of the extruder, cutting open the seal of the discharge spout of the bag, removing the lid of the feed inlet, connecting the bag to the feed inlet of the hopper and starting the unloading of the raw material by opening a adjusting a tie provided to the discharge spout of the bag. When the unloading is completed the following steps are carried out: adjusting the tie for closing the discharge spout, disconnecting the discharge spout of the bag from the feed inlet of the hopper and closing the lid of the feed inlet.

The problem with these prior art methods and arrangements is that they require considerable amount of manual work. The manual handling on the other hand causes risks that contaminants may get into the feed inlet of the hopper. Thus the prior art arrangements do not provide efficient means for preventing contaminants from getting into the feed inlet.

BRIEF DESCRIPTION OF THE INVENTION

An object of the present invention is thus to provide an arrangement and a method so as to overcome the above mentioned disadvantages of the prior art. The objects of the invention are achieved by an arrangement according to the characterizing portion of claim 1 wherein the arrangement comprises a first gas supply arranged to supply gas to the first part of the feed inlet cleaning the first part. The objects of the present invention are further achieved with a method according to the characterizing portion of claim 7 wherein by supplying cleaning gas into the feed inlet between the sealing means and the unloading spout connected to the feed inlet before opening the unloading spout or before opening the sealing means.

The preferred embodiments of the invention are disclosed in the dependent claims.

The invention is based on the idea of providing sealing means for opening and closing the feed inlet of the gable manufacturing apparatus when a bag a raw material is connected to the feed inlet. The sealing may be operated when the bag of raw material is connected to the feed inlet such that the feed inlet may be kept closed during connecting and disconnecting of the spout of the bag of raw material to the feed inlet. The feed inlet may then be opened and closed without disconnecting the bag of raw material from the feed inlet. The sealing means may also comprise a cutter for cutting the spout of the bag of raw material open when the bag is connected to feed inlet.

The present invention thus provides a safe, simple and readily automated means for unloading a box or a bag of raw material to an extruder of a cable manufacturing apparatus, while reliably preserving the cleanliness of the raw material and the unloading process under all circumstances. The present invention further eliminates need for special clean room area around the unloading arrangement and the bag of raw material as opening and closing of the feed inlet may be carried out when the bag of raw material is connected to the unloading arrangement. The arrangement of the present invention enables automated method for unloading the raw material into the cable manufacturing apparatus, the method comprising sequential steps that ensure continuous cleanliness of the volume between the bag of raw material the cable manufacturing apparatus. Therefore the present invention further reduces manual work for unloading raw material into the cable manufacturing apparatus.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
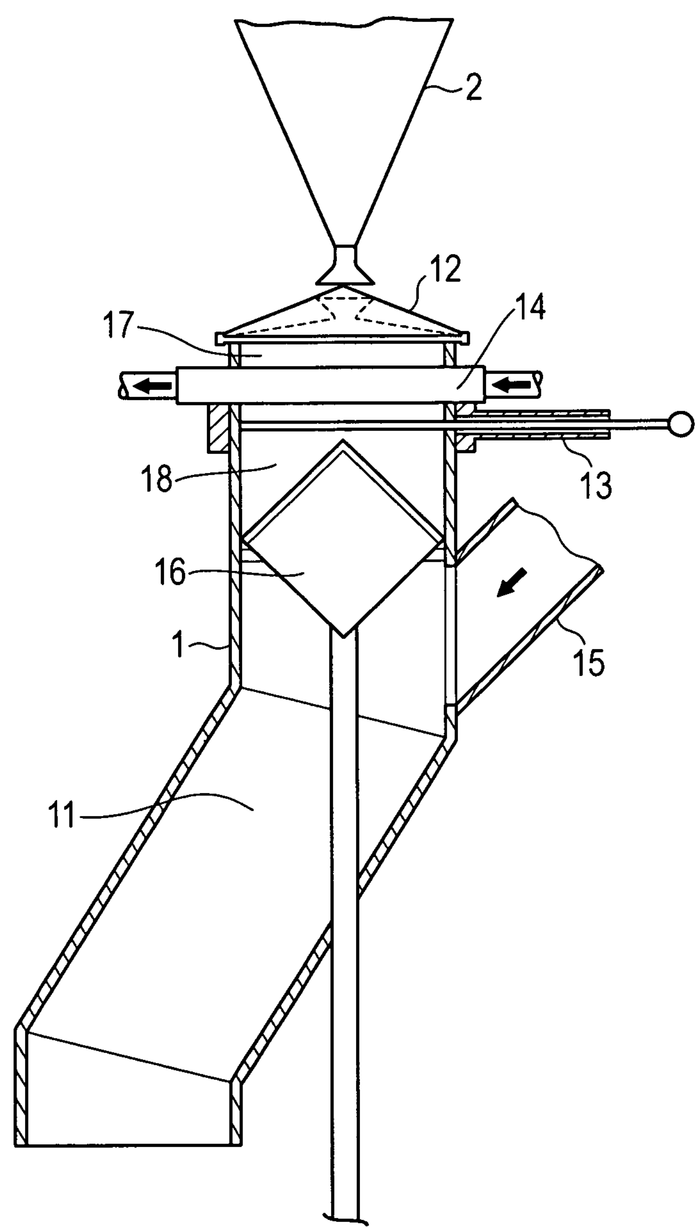
FIGS. 1 to 5 show schematically an arrangement according to one embodiment of the present invention for unloading raw material in connection with a cable manufacturing apparatus and sequential steps for unloading the raw material by using the arrangement.

FIG. 1 shows schematically one embodiment of the arrangement 1 according to the present invention. The arrangement 1, the loader mechanism, for unloading the raw material from a bag or a box comprises a feed inlet 11 for conducting the raw material into a hopper (not shown) or the like of a cable manufacturing apparatus or of an extruder of the cable manufacturing apparatus. The raw material may be for example polyethylene pellets used for forming an insulation layer over an electrical cable by an extruder. The feed inlet 11 may be pipe or another kind of conduit via which the raw material is passed into the cable manufacturing apparatus. The feed inlet 11 comprises a shutter valve 13 arranged to the feed inlet 11 such that it divides the feed inlet 11 to a first 17 and a second part 18. The first part 17 of the feed inlet 11 is distant from the cable manufacturing apparatus and may be opened to the surroundings and is arranged to receive the raw material. The fist part 17 also comprises the first end of the feed inlet 11 to which the bag of raw material is connectable. The second part 18 on the other hand is connected to the cable manufacturing apparatus. The second part 18 comprises a second end of the feed inlet 11 which is connected the cable manufacturing apparatus. Thus when the raw material unloaded from a bag it passes first through the first part 17 and then through the second part 18 into the cable manufacturing apparatus. The shutter valve 13 may be manually operable or automated shutter valve or any kind of shutter valve or corresponding sealing means for opening and closing the feed inlet 11 such that flow of raw material or raw material and any kind of substances, such as gasses, aerosols or liquids from the first part 17 into the second part 18 is prevented. The shutter valve 13 is operable independently of connecting or disconnecting the bag of raw material to the feed inlet 11.

Figure 2:
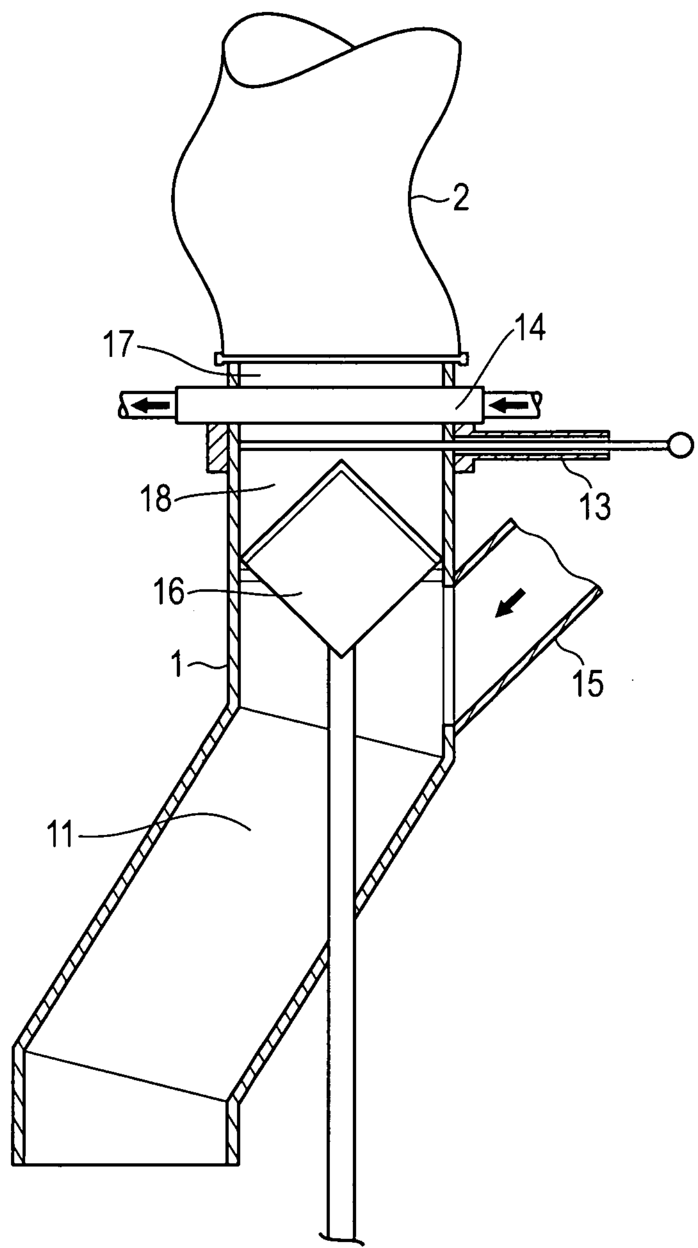

The arrangement 1 further comprises a feed inlet cover 12 for closing the feed inlet 11 when bag of raw material is not connected to the feed inlet 11. The feed inlet cover 12 may be any kind of lid cover or cap that may be placed to the first end of the feed inlet 11 for closing both the first and second parts 17, 18. When the feed inlet cover 12 is removed a spout 2 of a bag or a box of raw material may be connected to the first end of the feed inlet 11, as shown in FIG. 2. When the spout 2 of the bag of raw material is disconnected from the feed inlet 11, the feed inlet cover 12 may be placed back to the first end.

The arrangement 1 further comprises a first gas supply 14 arranged to supply gas, such as air, to the first part 17 of the feed inlet 11 cleaning the first part 17 of the feed inlet 11. The first gas supply 14 feeds gas to the first part 17 of the feed inlet 11 above the shutter valve 13 such that the thus generated gas flow removes contaminants from the first part 17 and prevents contaminants from entering the second part 18 when the shutter valve is opened. The arrangement 1 comprises also a second gas supply 15 arranged to supply gas to the second part 18 of the feed inlet 11 for providing an overpressure to the second part 18. The second gas supply 15 supplies gas to the second part 18 in order to clean out any dust and remaining particles from the feed inlet 11 and to create overpressure inside the second part 18 to eliminate any foreign particles or contaminants from getting in to the flow of raw material. The first gas supply 14 and the second gas supply 15 may both comprise one or more gas supply means or ducts for supplying gas. The first and second gas supply 14, 15 may also comprise one ore more filter for cleaning the gas or air supplied.

Figure 4:
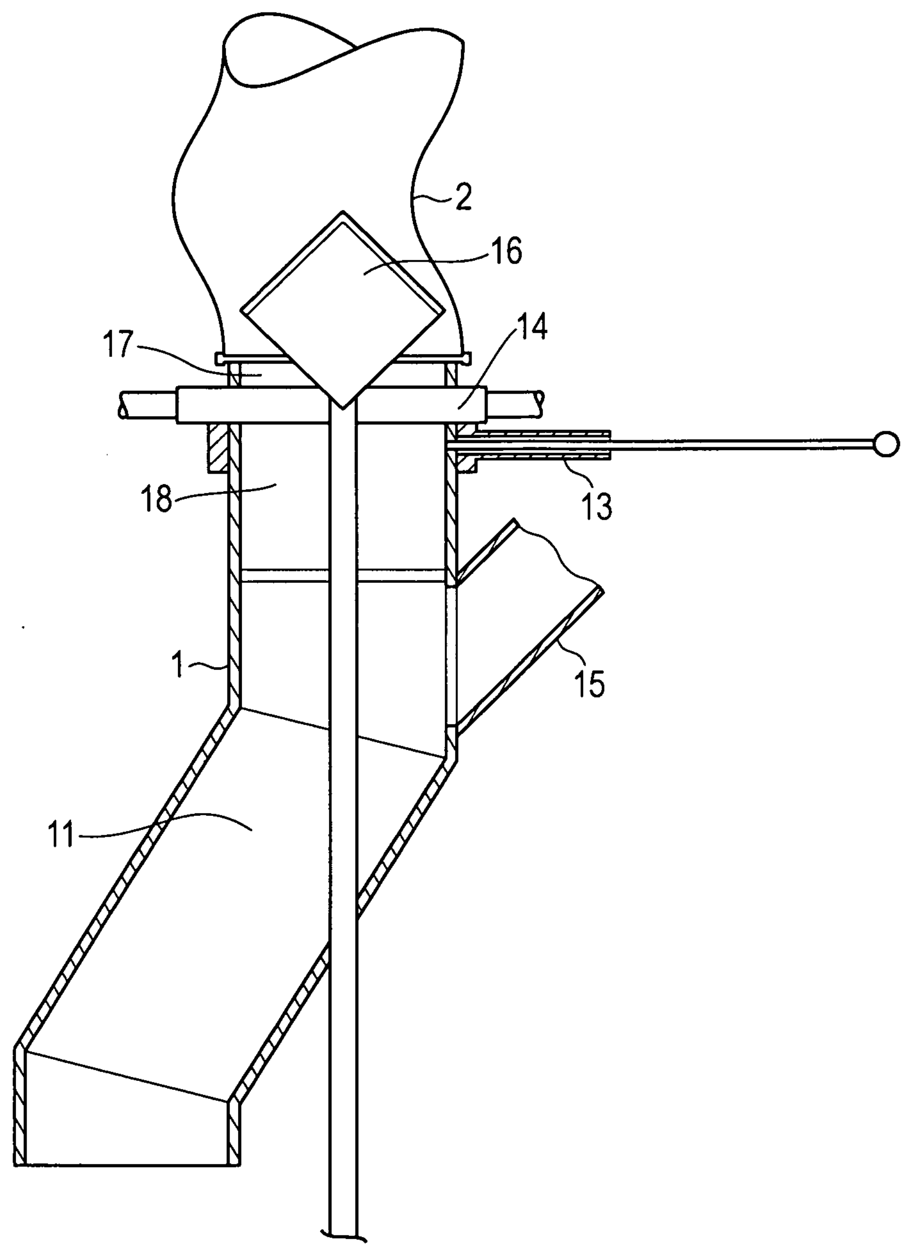

As shown in FIG. 1, the arrangement 1 further comprises a cutter 16 for cutting the unloading spout 2 of the bag or box of raw material open when the spout is connected to the feed inlet 11. The cutter 16 comprises one or more cutting blades and preferably it is arranged inside the feed inlet 11. As shown in FIG. 2, when the unloading spout 2 is connected to the feed inlet 11 and the shutter valve 13 is in closed position the cutter 16 inside the feed inlet 11. The cutter 16 is made movable such that may be moved from inside the feed inlet 11 at least partly into the unloading spout 2 for cutting the unloading spout 2 open, as shown in FIG. 4. The cutter 16 is moved when the unloading spout 2 is connected to the feed inlet 11 and the shutter valve 13 is in open position. After the unloading of the raw material is finished the cutter 16 is moved back from the unloading spout 2 inside the feed inlet 11. The cutter 16 may be may be operated manually or automatically. Operation of the cutter 16 may be for example integrated to the operation of the shutter valve 13 such that when the shutter valve 13 is opened the cutter is moved automatically into the unloading spout 2 and when the shutter valve is being closed the cutter is automatically moved back inside the feed inlet 11.

The above described arrangement 1 may be used for unloading raw material in to a cable manufacturing apparatus preferably comprising an extruder having a hopper for the raw material. An unloading method utilizing the arrangement 1 of the present invention is described in the following.

First a bag or a box of raw material is placed above or in the vicinity of the feed inlet 11. An unloading spout 2 of the bag is pulled out or arranged in place for connection with the feed inlet 11, as shown in FIG. 1. Then the feed inlet cover 12 is removed from the first end of the feed inlet 11 and the unloading spout 2 in connected to the first end of the feed inlet, as shown in FIG. 2. The shutter valve 13 is still in closed position preventing raw material from flowing to the second part 18 of the feed inlet 11. The first part 17 of the feed inlet 11 is cleaned by supplying cleaning gas with the first gas supply 14 into the feed inlet 11 between the sealing means 13 and the unloading spout 2 connected to the feed inlet 11 before opening the unloading spout 2 or before opening the sealing means 13. The first gas supply 14 may also be used already after the feed inlet cover 12 is being used before the unloading spout 2 is connected to feed inlet 11 and during connecting the unloading spout 2 to the feed inlet 11.

The second part 18 of the feed inlet cleaned and provided with overpressure by supplying clean gas with the second gas supply 15 into the feed inlet 11 between the sealing means 13 and the cable manufacturing apparatus before opening the unloading spout 2 or before opening the sealing means 13. The second gas supply may also be used before the feed inlet cover 12 is removed and the unloading spout 2 connected to the feed inlet 11 and also during the removing the feed inlet cover 12 and connecting the unloading spout 2.

Figure 3:
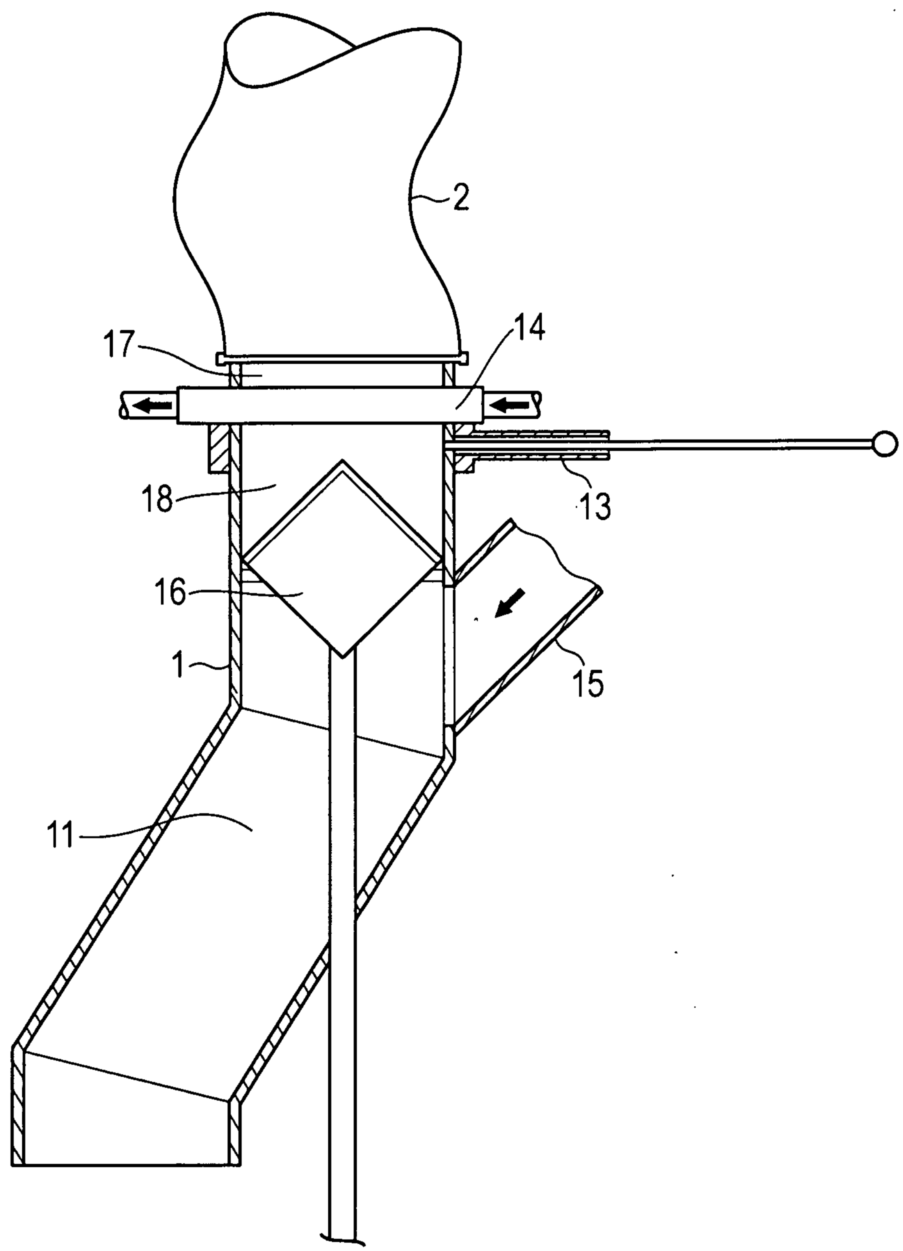

After the unloading spout 2 is connected to the feed inlet 11 and the first part 17 and the second part 18 supplied with clean gas with the first and second gas supply 14, 15, the shutter valve 13 is opened, as shown in FIG. 3. The clean gas supply is with the first and second gas supply 14, 15 is preferably continued until the shutter valve 13 is in fully open position. After the shutter valve 13 is fully opened the unloading spout 2 is opened with the cutter 16 and the gas supply with the first and second gas supply 14, 15 is stopped. The opening of the unloading spout 2 is carried by moving the cutter from inside the feed inlet 11 at least partly into the unloading spout 2 such that he cutter 16 cuts the unloading spout 2 open. The cutter 16 punches unloading spout 2 and the raw material starts to flow from the bag through the feed inlet 11 in to the cable manufacturing apparatus, and specifically into the hopper of the extruder. The unloading step is shown in FIG. 4.

Figure 5:
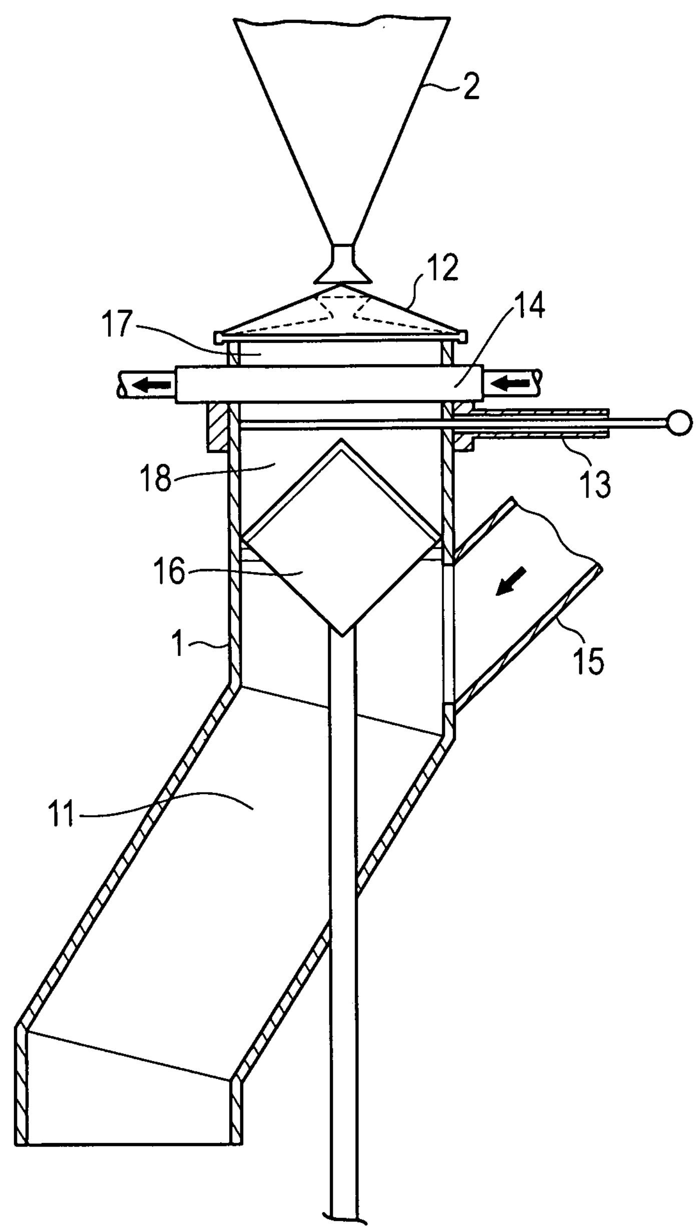

Once the bag of raw material is empty or the unloading is disrupted for some other reason, the cutter 16 is retracted in its initial position inside the feed inlet 11. Then the shutter valve 13 is closed, and clean gas or air is blown from the first and second gas supply 14 and 15. Cleaning gas is supplied into the feed inlet 11 between the shutter valve 13 and the unloading spout 2 connected to the feed inlet 11 and between the shutter valve 13 and the cable manufacturing apparatus after the raw material is unloaded and the sealing means closed and before unloading spout 2 is removed from the feed inlet 11. Gas supply from the fist and second gas supply may be started before the shutter valve 13 is closed, during the closing of the shutter valve 13 or after the shutter valve 13 is closed. Next the unloading spout 2 is disconnected and removed from the feed inlet 11 and the feed inlet cover 12 is put back on the first end of the feed inlet 11. The shutter valve 13 is closed before the unloading spout 2 is disconnected from the feed inlet 11 after feeding the raw material into the cable manufacturing apparatus. Thus the arrangement is put back to its initial state as shown in FIG. 5. When the feed inlet cover 12 is placed to the first end of the feed inlet, the gas supply from the first and second gas supply 14, 15 may be stopped.

The above described arrangement 1 and method enable opening and closing the feed inlet when the unloading spout of a bag of raw material is connected to the feed inlet 11. This provides an efficient way for unloading raw material into a cable manufacturing apparatus ensuring simultaneously cleanliness of the unloading such that contaminants are prevented from entering the cable manufacturing apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement for unloading raw material in connection with a cable manufacturing apparatus, the arrangement comprising a feed inlet connected to the cable manufacturing apparatus for feeding raw material into the cable manufacturing apparatus, the feed inlet being adapted to be connected to an unloading spout of the raw material, the arrangement comprising sealing means for opening and closing the feed inlet when the unloading spout is connected to the feed inlet, the sealing means being arranged to divide the feed inlet into a first part adapted to be connected to the unloading spout and a second part connected to the cable manufacturing apparatus, the sealing means further comprising a shutter valve opening and closing the feed inlet when the unloading spout is connected to the feed inlet and the arrangement further comprising a first gas supply arranged to supply gas to the first part of the feed inlet cleaning the first part.

2. An arrangement according to claim 1, wherein the arrangement comprises a second gas supply arranged to supply gas to the second part of the feed inlet for providing an overpressure to the second part.

3. An arrangement according to claim 1, wherein the arrangement comprises a cutter for cutting the unloading spout open.

4. An arrangement according to claim 3, wherein the cutter comprises a cutting blade for cutting the unloading spout open.

5. An arrangement according to claim 3, wherein the cutter is arranged inside the feed inlet.

6. An arrangement according to claim 5, wherein the cutter is movable from the feed inlet at least partly into the unloading spout for cutting the unloading spout open.

7. A method for unloading raw material in connection with a cable manufacturing apparatus, the method comprising the following steps connecting an unloading spout to a feed inlet; and opening the unloading spout for feeding raw material into the cable manufacturing apparatus through the feed inlet, the method further comprising sealing the feed inlet with sealing means operable for opening and closing the feed inlet when the unloading spout in connected to the feed inlet opening the sealing means after the unloading spout is connected to the feed inlet, and closing the sealing means after the raw material is fed into the cable manufacturing apparatus and before the unloading spout is disconnected from the feed inlet after feeding the raw material into the cable manufacturing apparatus, the method further comprising the step of supplying cleaning gas into the feed inlet between the sealing means and the unloading spout connected to the feed inlet before opening the unloading spout or before opening the sealing means.

8. A method according to claim 7, wherein gas is supplied into the feed inlet between the sealing means and the cable manufacturing apparatus before opening the unloading spout or before opening the sealing means.

9. A method according to claim 7, wherein the unloading spout is unloaded with a cutter by cutting the unloading spout open.

10. A method according to claim 7, wherein the sealing means is closed after the raw material is unloaded.

11. A method according to claim 7, the unloading spout is removed from the feed inlet after the raw material is unloaded and the sealing means closed.

12. A method according to claim 7, wherein cleaning gas is supplied into the feed inlet between the sealing means and the unloading spout connected to the feed inlet after the raw material is unloaded and the sealing means closed and before unloading spout is removed from the feed inlet.

13. A method according to claim 7, wherein gas is supplied into the feed inlet between the sealing means and the cable manufacturing apparatus after the raw material is unloaded and the sealing means closed and before unloading spout is removed from the feed inlet.

14. A method according to claim 9, wherein the unloading spout is opened by moving the cutter from the feed inlet at least partly into the unloading spout for cutting the unloading spout open.

15. A method according to claim 10, wherein the cutter is retracted from the unloading spout back into the feed inlet after the raw material is unloaded and before the sealing means are closed.

* * * * *